United States Patent

[11] 3,568,589

| [72] | Inventor | Romarico Robau |
| | | 4378 W. Flagler St., Miami, Fla. 33134 |
| [21] | Appl. No. | 844,485 |
| [22] | Filed | July 24, 1969 |
| [45] | Patented | Mar. 9, 1971 |

[54] COFFEE BREWING APPARATUS
3 Claims, 2 Drawing Figs.

[52] U.S. Cl. .................................................. 99/283,
99/285, 99/305, 99/307
[51] Int. Cl. ....................................................... A47j 31/00
[50] Field of Search........................................... 99/280-
—283, 285, 304, 305, 307

[56] References Cited
FOREIGN PATENTS
615,375   7/1935   Germany..................... 99/307

*Primary Examiner*—William I. Price
*Attorney*—Salvatore G. Militana

ABSTRACT: An improved coffee brewing apparatus having a three compartmented tank with the middle compartment containing coffee brewing water while the outer compartments contain hot water to maintain the coffee brewing water heated with heating elements utilized for heating all of the water. A brewing chamber connected to the coffee brewing water compartment and to a liquid sugar container having a homogenizing member at its midportion to spray sweetened water under pressure onto granules of coffee contained in a coffee retaining member whereby Cuban coffee of uniform quality and consistency is produced automatically.

Patented March 9, 1971 3,568,589

INVENTOR
ROMARICO ROBAU
BY
*Salvatore G. Militano*
ATTORNEY

COFFEE BREWING APPARATUS

This invention relates to coffeemakers and is more particularly directed to a coffee brewing apparatus for making Cuban coffee.

A principal object of the present invention is to provide a coffee brewing apparatus that upon operating a timer switch the apparatus automatically brews and delivers one or more cups of coffee wherein the heated water is sprayed in jets under pressure onto a receptacle containing granules of coffee.

Another object of the present invention is to provide a coffee brewing apparatus that automatically produces Cuban coffee by the use of water heated by electrical heating elements and maintained in heated condition by hot water surrounding the coffee brewing water and utilizing the steam pressure created by the heated water to force the water through a spray head into a brewing chamber.

A further object of the present invention is to provide a coffee brewing apparatus wherein the brewing chamber is divided into two chambers by a jet spray head whereby water under its own pressure as well as pressure from steam and air will be forced into a multiplicity of jet streams injected onto granules of coffee to brew a coffee of uniform quality and consistency and discharge same directly into a cup.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 1:
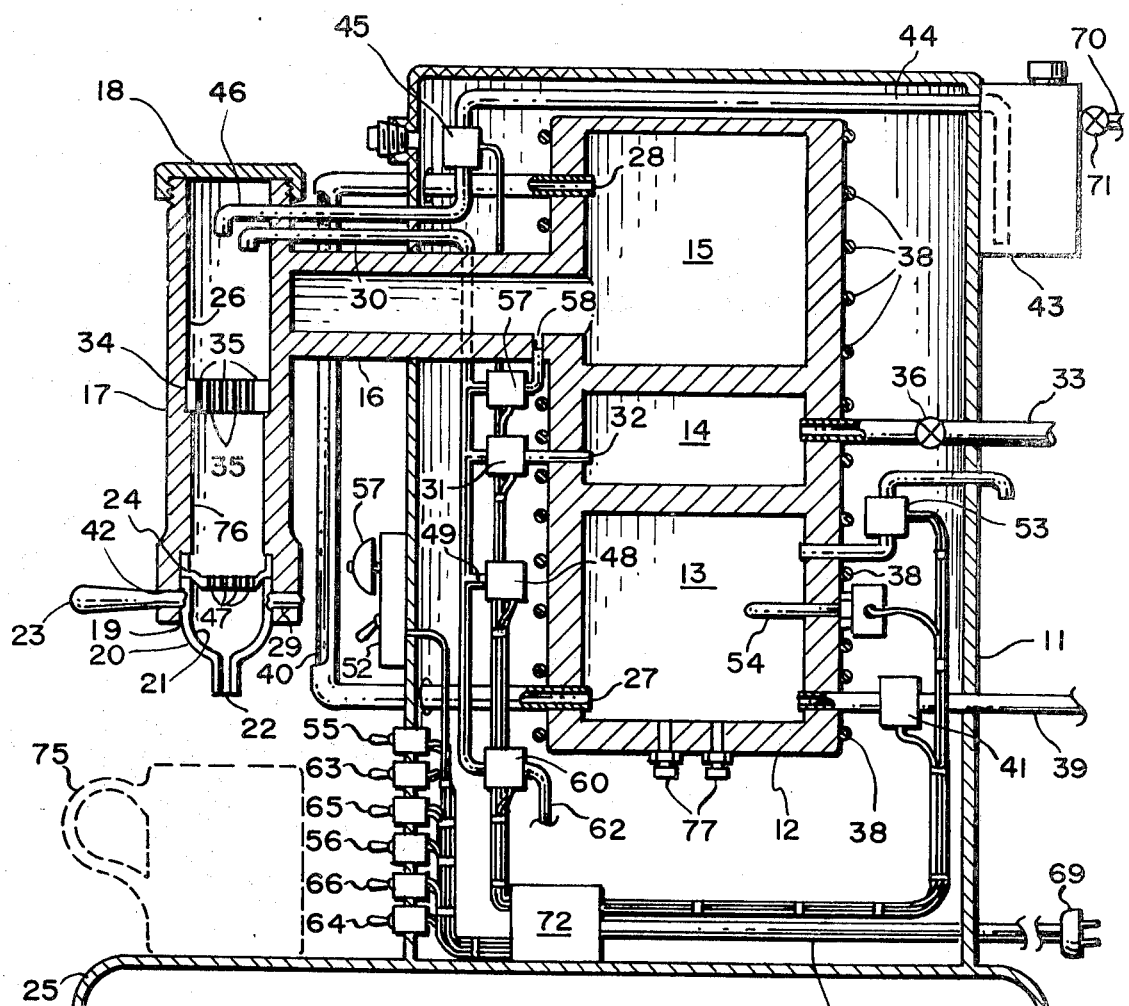
FIG. 1 is a cross-sectional view of a coffee brewing apparatus constructed in accordance with my invention.

Referring to the drawing wherein like numerals are used to designate similar parts throughout the several views, the numeral 10 refers to a coffee brewing apparatus constructed in accordance with my invention and consisting of compartmented tank 12 mounted within a housing 11 having a base portion 25 and wherein insulation is found in the unoccupied spaces between the tank 12 and housing 11. The tank 12 is provided with three compartments, 13, 14 and 15 with compartments 13 and 15 communicating with each other by means of a sight glass tube 40 which connects ducts 27 and 28 that extend to compartments 13 and 15 respectively. An arm 16 secured to the tank 12 extends through an opening in the housing 11 supports at its other end a coffee brewing device consisting of a vertically disposed tubular member 17 at whose upper end there is a cap 18 threadedly mounted thereon.

The discharge end 19 of the tubular coffee brewer 17 is enlarged to receive a coffee granule retaining member 24 having a plurality of small openings 47, and held in position by a discharge member 20 having a mixing chamber 21 and discharge spout 22. A handle 23 and lug 29 engage bayonet-type slots 42 that extend to the bottom edge of the discharge end 19 permitting the coffee retainer 24 and discharge member 20 to be releasably mounted in position as shown by FIG. 1. Within the chamber 26 of the tubular member 17 there is mounted a diffuser member 34 having a multiplicity of tiny bores or holes 35 extending therethrough whereby water under pressure is sprayed by the diffuser member 34 onto the coffee in the coffee retainer 24.

Water for brewing the coffee enters the chamber 14 through a water inlet pipe 33 having a one-way check valve 36. An outlet pipe 32 connects the compartment 14 with a pipe 30 that extends to the chamber 26 of the tubular member 17, there being a conventional solenoid operated valve 31 mounted on the pipeline 32 to control the flow of water to the chamber 26. The valve 31 is connected to a conventional timer 52 which is mounted on the front wall of the housing 11.

The timer 52 may be adjusted to allow as many cups of water to flow to the chamber 26 as is appropriate for the amount of coffee placed in the coffee retainer 20. The timer 52 also controls a solenoid valve 45 that is mounted in the pipeline 44 that extends from the bottom portion of a liquid sugar receptacle 43 to pipeline 46 and the chamber 26. The liquid sugar in the receptacle 43 is maintained under proper pressure by a pipe 70 that extends to a source of air under pressure (not shown) and has a check valve 71 therein.

If it is desired that the coffee being brewed be not as strong as the normally brewed Cuban coffee further water can be injected in the chamber 26 during a brewing operation upon closing the manual switch 55 that operates and opens the solenoid valve 31. When the desired additional water has deposited in the chamber 26, the switch 55 is opened and the solenoid valve 31 will then close to shut off the water flow from the compartment 14.

Water is fed into compartment 13 through pipeline 39 and controlled by a solenoid valve 41 mounted on the pipeline 39 with a manual switch 56 connected to the solenoid valve for opening the valve 41 when additional water is periodically required in compartments 13 and 15. The level of the water in compartments 15 and 13 is readily ascertained upon viewing the level of water in the sight glass 40. Heating elements 38 coiled about the tank 12 to maintain the water in the chambers 13, 14 and 15 at the desired hot temperatures, which is controlled by a thermostat 54 mounted in the lower chamber 13 and connected to a control dial 51 for setting the desired temperature at which the water is to be heated. A conventional water pressure safety valve 53 connected to the chamber 13 will cause the discharge of steam and water out of the compartments 13 and 15, should the temperature of the water rise to a dangerous level.

The quality of the coffee brewed by my apparatus 10 is contingent upon the steam pressure made available at the chamber 26 to force the water through the orifices 35 and spray same onto the granules of coffee contained in the coffee retainer 24 so that a dark, heavy and syrupy coffee, known as Cuban coffee is produced. In order to be sure that a proper pressure is available at all times during the brewing of coffee another source of steam as well as air pressure is present in the apparatus 10. A pipe 58 which communicates with the compartment 15 is provided with a solenoid valve 57 that is connected to the water line 30. A switch 65 mounted on the front wall of the housing 11 is connected to the solenoid valve 57 to permit wet steam to pass from the compartment 15 through the pipe 58 and water pipe 30 and into the coffee making chamber 26. In the event pressure alone is required but without any additional water, switch 66 is closed, energizing an air compressor 48 having an air inlet 59 and outlet 49 connected to pipeline 30. Air under pressure then flows from the compressor 48 through the outlet pipe 59, and into the water line 30 and into the coffeemaking chamber 26. In the event pressure becomes too high or for any reason is not released from the chamber 26 after the coffee brewing operation is completed, a switch 63 mounted on the housing 11 is closed operating a solenoid valve 60 which opens the water line 30 to vent to the atmosphere the pressure contained in the chamber 26 by means of the pipe 62 connected to the solenoid 60.

Figure 2:
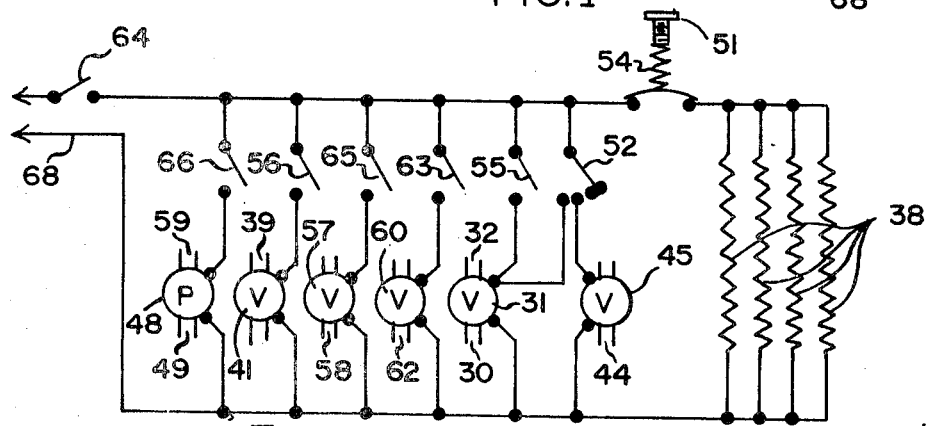
FIG. 2 is a schematic wiring diagram of the electrical circuit used in my coffee brewing apparatus.

A master switch 64 is likewise mounted on the front wall of the housing 11. The switch 64 is connected to a source of electricity (not shown) by means of a plug 69 connected to a wire 68 which in turn is connected to terminals in a junction box 72 in the manner illustrated by the schematic diagram in FIG. 2. As shown by FIG. 2, all of the switches which are normally open are connected in parallel with the thermostat 55. Upon closing the master switch 64, the heating coils 38 are energized and the heating coils 38 then operate as controlled by the thermostat 54 to heat the water in the compartments 13, 14 and 15. If the compartments 13 and 15 have insufficient water therein, switch 56 is closed to open the solenoid valve 41 and permit water to flow through pipe 39 into the compartments 13 and 15 via the sight glass 40.

The coffee brewer 20 is removed by shifting the handle 23 laterally until the handle 23 and lug 29 are free of their respective slots 42 permitting the coffee retainer 24 to be removed. The coffee retainer 24 is then filled with coffee and returned to its position in the outlet 19 and the coffee brewer 20 secured back into position with the handle 23 and lug 29 engaged in the slots 42.

Then the switch in the timer 52 is actuated causing solenoid valves 31 and 45 to become opened and permit a mixture of hot water and steam under pressure to flow from the compartment 14 through pipes 32 and 30 into compartment 26 above the diffuser or spray member 34. At the same time as the definite quantity of water is deposited in the chamber 26, a certain quantity of liquid sugar is permitted to flow through the pipes 44 and 46 and be discharged into the chamber 26 mixing with the water and steam under pressure therein. Upon completion of the cycle of operation of the timer 52, bell 57 will ring to warn the operator that the water and sugar have been deposited in the mixing chamber 26 and the brewing operation is commenced. This mixture of sweetened water is forced through the multiplicity of small orifices 35 causing the spray to be injected onto the coffee granules in the coffee retainer 24. The brewed coffee then passes through the openings 47 in the coffee retainer 24, into the chamber 21 of the coffee brewer 20 and discharged through the outlet 22 into a cup 75 placed therebelow.

The coffee normally produced by my coffee brewing apparatus 10 will be black, thick, sweet and strong, known as Cuban coffee. Any desired variation of this coffee can be produced by adding more water than normally by closing the switch 41.

The water that is in compartment 14 is used in the making of coffee while the water in compartments 13 and 15 when heated maintains the water 14 in a heated condition. Also when steam is required for additional pressure in the mixing chamber 26, the solenoid valve 57 may be actuated to its open position by operating the switch 65 and wet steam is drawn from the compartment 15 and discharged into the mixing chamber 26. Also, if it is desired to use the hot water in the compartments 13, 15 for auxiliary purposes such as for washing dishes, etc., then connections 77 mounted on the lower wall of the compartment 13 may be connected to pipes (not shown) that would extend beyond the outer housing 11 to a washstand or the like.

I claim:

1. Coffee brewing apparatus comprising a tank having a plurality of compartments, one of said compartments being centrally disposed, heating means mounted about said tank, a coffee brewing member having an elongated chamber, a jet producing spray member mounted in said chamber intermediate the ends thereof, duct means connecting said centrally disposed compartment and said coffee brewing member above said spray member, removable coffee granule retaining means mounted in the lower end of said coffee brewing member, said coffee retaining means having a mixing chamber and a discharge port for discharging the brewed coffee, valve means mounted in said duct means and timer means controlling the actuation of said valve means for regulating the quantity of heated water discharged from said centrally disposed compartment to said coffee brewing member.

2. The structure as recited by claim 1 taken in combination with sight glass means connecting the other of said compartments, a liquid sugar container, duct means connecting said sugar container and said coffee brewing member, valve means mounted in said sugar duct means and means connecting said sugar control valve means and said timer for discharging a desired quantity of liquid sugar in said coffee brewing member simultaneously with water from said centrally disposed compartment.

3. The structure as recited by claim 2, pipe means connecting said other of said compartments with said water duct means, valve means mounted in said pipe means and control means actuating said last named valve means for discharging wet steam from said other of said compartments into said duct means.